United States Patent [19]

Pier

[11] Patent Number: 4,788,864
[45] Date of Patent: Dec. 6, 1988

[54] BLEED PATH FOR ELECTRIC CHARGE

[75] Inventor: Nicolas F. Pier, Thousand Oaks, Calif.

[73] Assignee: Litton Systems, Inc., Beverly Hills, Calif.

[21] Appl. No.: 53,882

[22] Filed: May 26, 1987

[51] Int. Cl.[4] .............................................. G01P 15/13
[52] U.S. Cl. ................................................... 73/517 B
[58] Field of Search .......................... 73/517 B, 862.61

[56] References Cited

U.S. PATENT DOCUMENTS

| | | | |
|---|---|---|---|
| 3,229,530 | 1/1966 | Wilcox et al. | 73/517 B |
| 4,353,254 | 10/1982 | Schroeder et al. | 73/517 B |
| 4,498,342 | 2/1985 | Aske | 73/517 B |
| 4,584,885 | 4/1986 | Cadwell | 73/862.61 |
| 4,679,434 | 7/1987 | Stewart | 73/517 B |

Primary Examiner—Stewart J. Levy
Assistant Examiner—Robert P. Bell
Attorney, Agent, or Firm—Nilsson, Robbins, Dalgarn, Berliner, Carson & Wurst

[57] ABSTRACT

An inertial sensing device with a movable sensing element is provided with a conductive path for bleeding excess electric charge from the sensing element. The path may extend from the sensing element to a control circuit or other predetermined portion of the device and preferably includes an electrical component having a preselected impedance. In a specific embodiment, the electrical component is a block of semiconductive material and has a time constant smaller than the time constant associated with the build-up of charge on the sensing element.

15 Claims, 1 Drawing Sheet

BLEED PATH FOR ELECTRIC CHARGE

BACKGROUND OF THE INVENTION

This invention relates generally to the field of motion sensing instruments and, more particularly, to a path for bleeding excess electric charge from an inertial sensing element.

Inertial instruments often have an electrically isolated sensing element or "forcer" mounted for movement relative to a base in response to external forces. One such instrument is an accelerometer which relies on magnetic interaction between a sensing element and a base to correct for inertial movement of the sensing element.

Isolation of a sensing element from its base sets up capacitive paths which cause electric charge on the element to build up and dissipate in an uncontrolled manner. These effects occur exponentially with a long effective time constant. As a result, electrostatic forces between the sensing element and the base vary over time in a manner unrelated to sensed input, producing an unpredictable time-dependent response known as "drift error". Unlike a constant bias or short-lived transient effects, drift error cannot be eliminated by calibration.

Drift error is especially troublesome in accelerometers which apply corrective forces to a movable sensing element by interaction between a stationary permanent magnet and a coil carried by the sensing element. In such instruments, the sensing element is typically mounted for pivotal movement by hinges which also conduct electricity to the coil. Shorting of the hinges is prevented by insulating pads disposed between the hinges and the sensing element. Such pads are thin and have a high dielectric constant, providing ideal capacitive paths which tend to charge the sensing element over time.

It is therefore desirable in many instances to provide a method for eliminating the effects of electrostatic forces caused by the build-up of excess charge on an inertial sensing element.

SUMMARY OF THE INVENTION

The present invention relates to a sensing device having a base and a sensing element supported for movement relative to the base under the influence of inertial forces, wherein a conductive path extends from the sensing element to a portion of the device maintained at a characteristic reference potential for bleeding excess electric charge from the sensing element.

In a preferred embodiment, the sensing element is electrically isolated from the base and the device includes a control circuit for use in applying corrective forces to oppose movement of the sensing element. The control circuit has a reference location held at said reference potential, and the conductive path comprises an electrical component of preselected impedance leading to the reference location to pass electric charge and thereby maintain the sensing element at substantially the reference potential. The electrical component preferably has an effective time constant for the exponential dissipation of charge which is less than that associated with the capacitive build-up of charge on the sensing element and less than the time over which the device is calibrated. In a further embodiment, the electrical component is a pad or other mass of semiconductive material having an impedance between 5 kilo-ohms and 1 mega-ohm.

The conductive path of the present invention permits charge to flow relatively rapidly between the sensing element and a point of known potential in the control circuit. This causes the sensing element to follow the potential of the circuit and prevents uncontrolled and unpredictable charging effects. The conductive path should have an impedance high enough to prevent a short circuit when the sensing element hits a stop at the end of its travel but should be conductive enough to equalize charge within the period of calibration. As long as the device is calibrated over a period substantially greater than the effective time constant of the bleed path, transient effects disappear.

BRIEF DESCRIPTION OF THE DRAWINGS

The above and other features of the present invention may be more fully understood from the following detailed description, together with the accompanying drawings, wherein similar reference characters refer to similar elements throughout and in which.

DESCRIPTION OF THE PREFERRED EMBODIMENT

Figure 1:
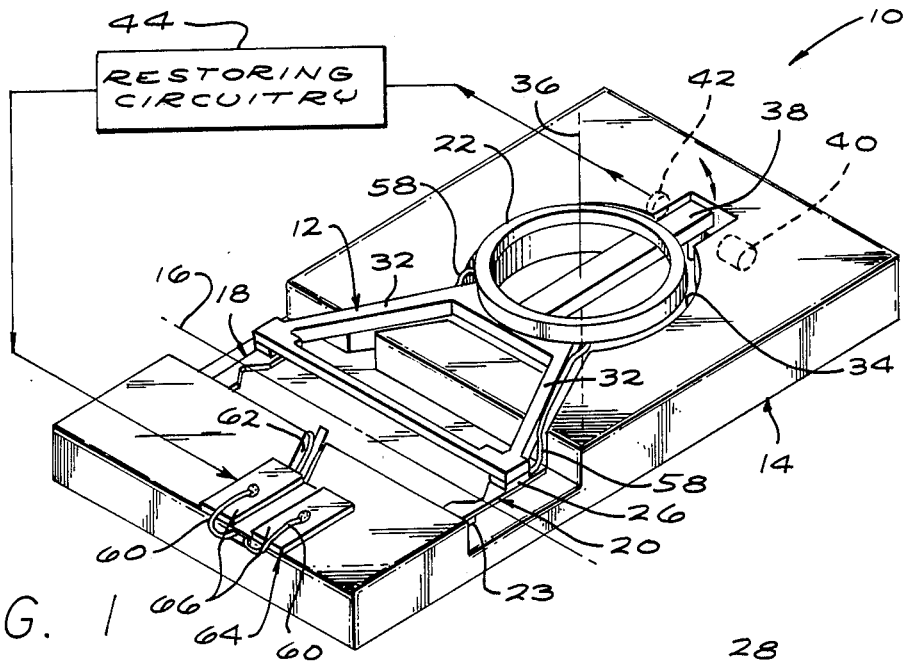
FIG. 1 is an isometric view of an accelerometer embodying a bleed path in accordance with a preferred embodiment of the present invention with a block diagram of a simple restoring circuit superimposed thereon.

Referring now to the drawings, specifically FIG. 1, one form of sensing device 10 constructed in accordance with the invention is an accelerometer of the moving coil type in which a sensing element or strut 12 is mounted to a base or frame 14 for pivotal movement about an axis 16. The strut 12 is mounted to the frame 14 by metallic hinge structures 18 and 20 which conduct an electrical current to a control coil 22 carried by the strut. A pair of insulator pads 23 separate the hinge structures from the frame 14, and an insulator pad 24 isolates the hinge structure 18 from the strut. The hinge structure 20, however, is electrically connected to the strut by a semiconductor pad 26 to pass electric charge back and forth between the strut 12 and the hinge structure 20. The semiconductor pad 26 has a time constant for the exponential bleeding of charge which is less than the effective time constant associated with the tendency of the strut to build up electric charge and less than the time over which the device 10 is calibrated, causing the block 26 to dissipate or "bleed" excess electric charge from the strut 12 and maintain the strut at substantially the potential of the hinge structure 20. This eliminates time-dependent electrostatic forces which would otherwise be present between the strut 12 and the frame 14 due to capacitive coupling at the points of connection and in doing so prevents drift errors in the output of the device.

As shown in FIG. 1, the strut 12 has a pair of corner portions 28 disposed above the hinge structures 18 and 20, respectively, and connected by a cross member 30. Arms 32 extend forwardly and inwardly from the corner portions to support the coil 22. The strut is received within a complementary recess 34 of the frame 14 for limited pivotal movement in response to acceleration forces along a sensing axis 36. Movement of the strut is detected as movement of a shadow bar 38 relative to a pick-off made up of a light-emitting diode (LED) 40 and a photodetector 42. The output of the photodetector is applied to conventional restoring circuitry 44 which passes a current through the conductive hinge structures to the control coil 22. The current generates a magnetic field which interacts with a field of a stationary magnetic element (not shown) of the frame 14 to oppose inertial movement of the strut. Thus, the restoring circuitry 44 closes a feedback loop to drive the control coil 22 and the strut 12 back to a "rest" position following inertial movement. In an analog system, the restoring circuitry 44 includes a feedback amplifier and a "quantizer" for summing current to the coil 22 as a measure of acceleration. In a pulse-type system, the circuitry 44 also includes pulse-shaping electronics of conventional design. Such circuitry is well known in the field of inertial instruments will not be described in detail herein.

Figure 2:
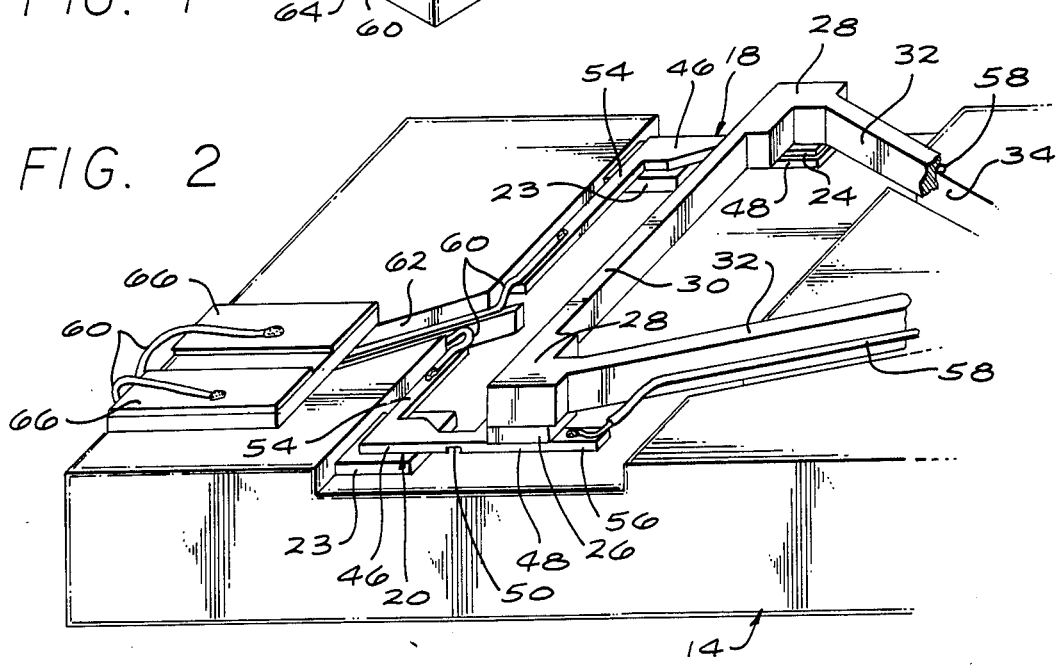
FIG. 2 is an enlarged fragmentary isometric view of a portion of the device of FIG. 1 which is rotated approximately 90 degrees clockwise from the orientation of FIG. 1.
Figure 3:
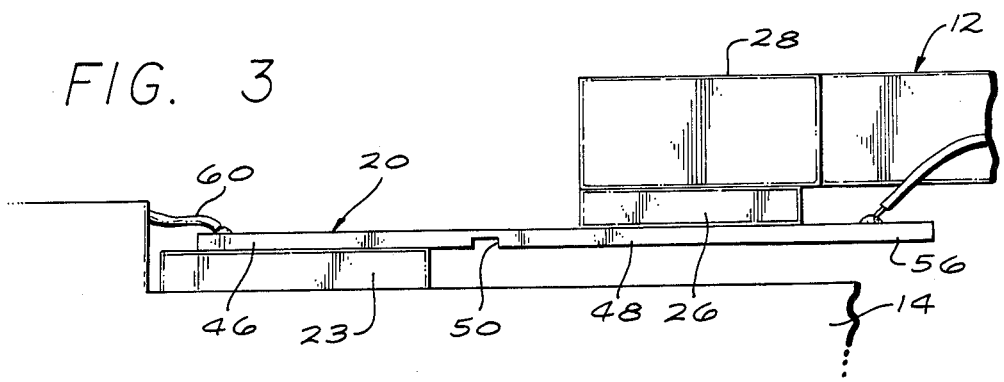
FIG. 3 is a further enlarged fragmentary side elevational view of a portion of the device of FIGS. 1 and 2 in the area of the bleed path.

Referring to FIG. 2, the hinge structures 18 and 20 are mirror images of each other and are similar in design to conductive hinges used in prior moving coil accelerometers. They have a rear hinge pad 46 and a forward hinge pag 48 connected by a narrowed hinge portion 50. A groove 52 directed transversely across the narrowed hinge portion 50 and along the pivotal axis 16 is provided at the lower surface of each hinge structure to facilitate bending.

Each rear hinge pad 46 has a rear connecting portion 54 which extends inwardly from the remainder of the hinge structure for electrical connection. Each forward hinge pad 48 has a forward connecting portion 56 for attachment of a corresponding lead 58 of the control coil 22. Thus, electrical inputs provided across the rear connecting portions 54 are conducted by the hinge structures and the leads 58 to the control coil 22. Such inputs reach the rear connecting portions 54 by a pair of conductive leads 60 which extend along a wire lay groove 62 of the frame 14. Connection to the output of the restoring circuitry 54 is made possible by a terminal board 64 having pads 66 to which the respective wires are soldered.

As mentioned above, the corner portions 28 of the strut 11 are physically connected to the hinge structures 18 and 20 through the insulator pad 24 and the semiconductor pad 26, respectively. The insulator pad 24 is similar to insulators of prior art devices in which the strut is isolated from both hinges. The semiconductor pad 26 may be similar in size to the insulator pad but is made of a material having sufficient conductivity to substantially equalize the electric charge and thus the potential of the strut relative to the hinge structure within a short time. More specifically, the time constant of the semiconductor pad 26 should be less than the effective time constant associated with capacitive build-up of excess charge and less than the period over which the device is calibrated. This assures that the sensing element is not exposed to time-dependent electrostatic forces of the type developed in prior art devices. In accordance with these teachings, the semiconductor pad 26 may have a resistivity between 5 kilo-ohms and 1 mega-ohm, with a preferred value of approximately 500 kilo-ohms.

A preferred material for the semiconductor pad 26 is crystalline silicon in the (1,1,1) configuration. It may be either intrinsic or doped, depending on the size of the pad and the precise resistance desired. Applicant has produced working devices of both types; however, doped material is preferred because the resistivity of the bleed path can then be fine-tuned without varying the dimensions of the hinges or the strut members.

Preferred dimensions for a semiconductor pad of intrinsic crystalline silicon having a total resistance of approximately 500 kilo-ohms are as follows:
Length: 40 mils (1.0 mm),
Width: 25 mils (0.6 mm),
Thickness: 5 mils (0.1 mm).

The insulator pads 23 and 24 are preferably made of alumina ($Al_2O_3$) or other material of high dielectric constant and are held in place by layers of adhesive, such as epoxy, at their major surfaces. The pads 23 are positioned between the rear hinge pads and the upper surface of the frame 14 to insulate the hinge structures from the frame. The pad 24 similarly insulates the forward hinge pad 48 of the hinge structure 18 from the corresponding corner portion of the strut 12.

Attachment of the semiconductor pad 26, however, is more sensitive than attachment of the insulator pads 23 and 24 because the semiconductor pad must make ohmic contact to the strut 12 and the hinge structure 20 in order to bleed excess charge from the strut. A preferred method of contact is to bond the semiconductor pad to the strut and the hinge by an extremely thin coating of epoxy. The coating need not be conductive if it is thin enough to permit tunneling of electrons. Alternative methods of obtaining the required combination of conductivity and mechanical strength are to solder or ultrasonically bond the elements together. A thin film of a metal which makes an ohmic contct with the material of the semiconductor pad may then be applied to the upper and lower surfaces of the pad to enhance conductivity. For simplicity, the drawings do not show layers of epoxy, solder or metal associated with the semiconductor pad 26 and the insulator pads 23 and 24.

In operation, the sensing device 10 is calibrated to account for any bias in output caused by imperfections in the device or its operation. Such imperfections might include a net spring force due to slight bending of the hinge structures at zero displacement or a difference in potential between the strut 12 and the frame 14. Because the strut 12 is maintained at substantially the potential of the hinge structure 20, electrostatic interaction between the strut and the frame is predictable and can be compensated for by calibration.

In the absence of acceleration forces, the strut 12 assumes a rest or "null" position in which the shadow bar 38 obstructs light passing from the LED 40 to the photodetector 42, leading to a null input to the restoring circuitry 44. The magnitude of this input is measured in the course of calibration. In response to the null input, the restoring circuitry 44 passes a "zero-bias" current through the control coil 22 to maintain the strut at the null position. If the sensing device 10 were perfect, this current would be zero. However, a non-zero current is required in the real world to counteract spring forces and electrostatic forces at the null position.

When the device 10 is exposed to acceleration along its sensing axis 36, the strut 12 pivots up or down relative to the frame 14. This movement is detected by the photodetector 42 which signals the restoring circuitry 44 to produce an appropriate opposing current in the control coil. The opposing current continues until the shadow bar 38 again assumes the null position, at which time the photodetector 42 causes the circuitry 44 to resume the zero-bias current. Thus, the photodetector 42, the restoring circuitry 44 and the control coil 22 perform a servo function to return the strut 12 to the null condition after acceleration. As stated above, the restoring circuitry 44 may also integrate the control current over time in order to quantify the magnitude of acceleration to which the device is exposed.

Throughout the operation of the device 10, charges developing on the strut 12 by capacitive coupling or other means are dissipated or bled through the semiconductor block 26 to maintain the strut at substantially the potential of the conductive hinge structure 20. This is done relatively rapidly with an appropriately short time constant, as discussed above. The time constant of charge dissipation is, of course, determined by the impedance, and primarily the resistance, of the semiconductor pad 26. Although electrostatic forces between the strut 12 and the frame 14 are typically non-zero, they are accounted for in calibration and do not produce output errors. At the same time, the resistance of the semiconductor block 26 is high enough (at least 5 kilo-ohms and preferably approximately 500 kilo-ohms) to eliminate momentary grounding of the control circuit if the strut 12 moves far enough to rach a mechanical "stop". Thus, the semiconductor block 26 provides a bleed path for excess electric charge without exposing the control circuit to damage due to grounding.

The foregoing discussion of electric charge being bled "from" the sensing element encompasses the reduction of either positive or negative charges from the sensing element despite the fact that a positive charge is reduced by a net flow of electrons to the sensing element rather than from it. In this sense, the work "from" refers to the charge removed from the sensing element rather than the direction of electron flow required to remove it.

From the above, it can be seen that the sensing device of the invention eliminates transient electrostatic forces which contribute to drift in the output of the device.

The appended claims are not limited to the embodiments described herein but rather are intended to cover all variations and adaptations falling within the true scope and spirit of the invention. Specifically, the invention is not limited to use in devices for sensing acceleration but is useful, as well, in other inertial instruments having a sensing element substantially isolated from a base. In addition, the bleed path need not be a semiconductor pad but may be any path having the described ability to bleed off electric charge without adversely affecting device sensitivity. In some cases, the path can be provided by connecting one or more discrete circuit elements between the sensing element and a point of known potential. Such elements are connected to the device by flexible leads in the absence of a hinged mounting of the type described herein. Additionally, the reference potential to which the bleed path is connected may be any potential of known magnitude, including the ground potential of the base 14.

What is claimed is:
1. A sensing device comprising:
a base;
a sensing element mounted to the base by hinge means having at least one conductive portion, for relative movement under the influence of inertial forces;
means for substantially insulating the sensing element from a first preselected portion of the hinge means;
a conductive coil carried by the sensing element and having electrical leads connection to the conductive portion of the hinge means for application of an electrical input to the coil; and
conductive path means extending from the sensing element to a second preselected portion of the hinge means of the device for bleeding electric charge from the sensing element.

2. A sensing device comprising;
a base;
a sensing element mounted to the base by first and second conductive hinge elements for relative movement under the influence of inertial forces;
a control circuit for use in applying corrective forces to oppose said movement, the control circuit comprising a conductive coil carried by the sensing element and having first and second electrical leads connected to the first and second hinge elements, respectively, for application of an electrical input to the coil through the hinge elements;
means for substantially insulating the sensing element from the first hinge element;
conductive path means extending from the sensing element to the second hinge element for bleeding excess electric charge from the sensing element.

3. The sensing device of claim 2 wherein:
the conductive path means comprises an electrical component having an impedance connected between the sensing element and the second hinge element to pass electric charge and maintain the sensing element at substantially the potential of the second hinge element.

4. The sensing device of claim 3 wherein:
said electrical component has a preselected time 5. The sensing device of claim 4 wherein:
said preselected time constant is less than an effective time constant over which charge on the sensing element tends to build up and dissipate through capacitive paths.

6. The sensing device of claim 3 wherein:
said impedance comprises an electrical resistance of approximately 500 kilo-ohms.

7. The sensing device of claim 3 wherin:
said impedance comprises an electrical resistance between 5 kilo-ohms and 1 mega-ohm.

8. The sensing device of claim 3 wherein:
the electrical component of the conductive path means includes a mass of semiconductor material.

9. The sensing device of claim 2 wherein:
the sensing element is mounted to the base for relative movement under the influence of acceleration forces.

10. The sensing device of claim 2 wherein:
the sensing element is conductive;
an insulating member is disposed between the first hinge element and the sensing element; and
the conductive path means comprises a pad of semiconductive material disposed between the second hinge element and the sensing element to bleed excess electric charge from the sensing element.

11. The sensing device of claim 10 wherein:
the pad of semiconductive material has an electrical resistance between 5 kilo-ohms and 1 mega-ohm.

12. The sensing device of claim 10 wherein:
the pad of semiconductive material comprises silicon.

13. The sensing device of claim 10 wherein:

the pad of semiconductive material comprises (1,1,1) silicon.

14. A method of reducing transient charging effects in a sensing device having a base and a sensing element supported for hinged movement relative to the base under the influence of inertial forces, the sensing element being substantially insulated from the base and supporting a control coil thereon for use in applying corrective forces to oppose movement of the sensing element, comprising the steps of:

maintaining a preselected portion of the base at a characteristic reference potential; and bleeding electric charge from the sensing element to said preselected portion during operation to maintain the sensing element at said characteristic reference potential.

15. The method of claim 14 wherein:

said electric charge is bled from the sensing element according to a preselected time constant less than the effective time constant over which charge on the sensing element tends to build up and dissipate through capacitive paths.

* * * * *